Sept. 7, 1965 J. B. GUSTAVSON 3,204,560
SOLID ROCKET PROPELLANT CONTAINING METAL ENCAPSULATED GAS
Filed April 24, 1961
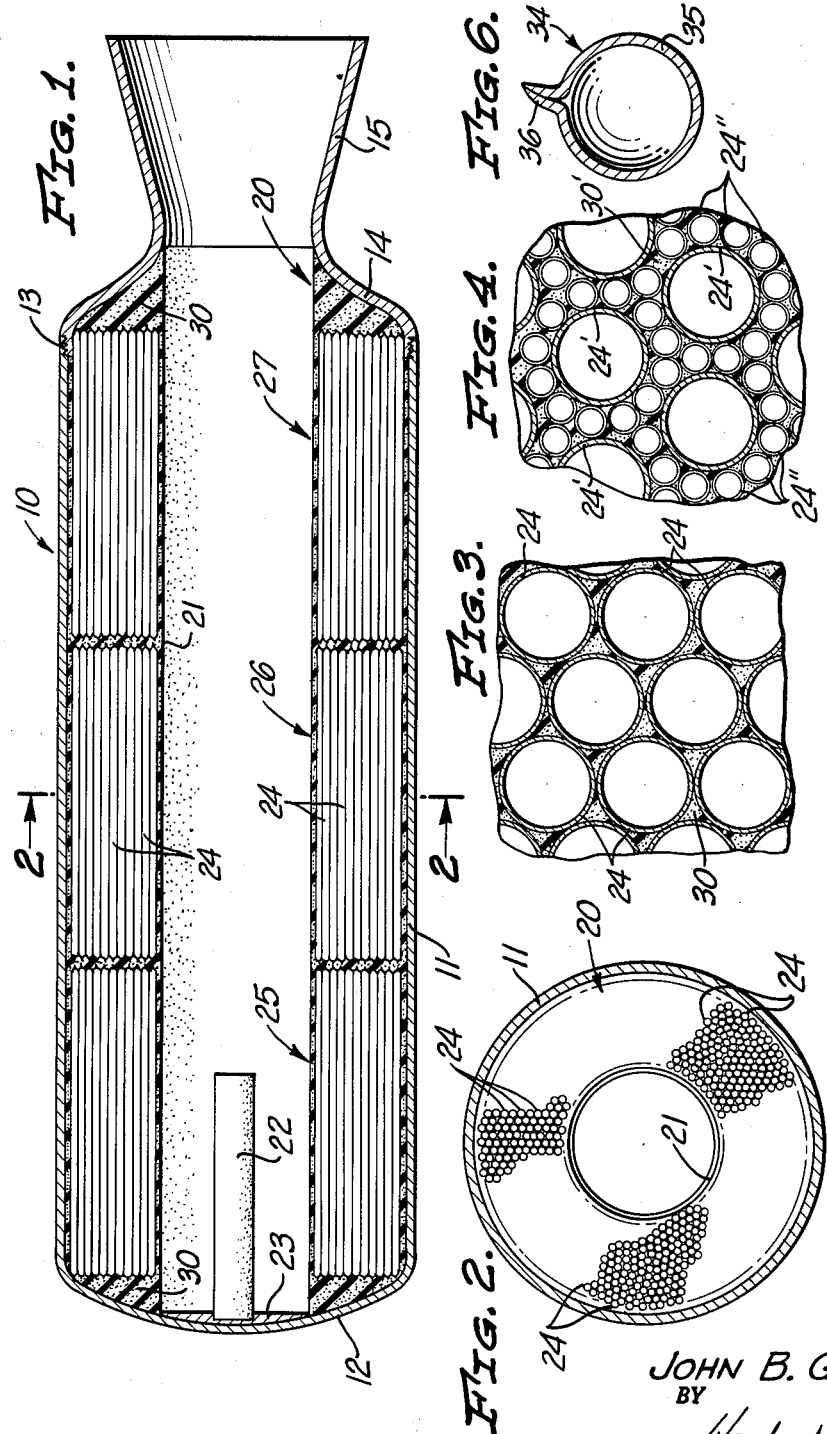
INVENTOR.
JOHN B. GUSTAVSON
BY
Herbert E. Kidder
AGENT

United States Patent Office 3,204,560
Patented Sept. 7, 1965

3,204,560
SOLID ROCKET PROPELLANT CONTAINING
METAL ENCAPSULATED GAS
John B. Gustavson, Redlands, Calif., assignor, by mesne
assignments, to Lockheed Aircraft Corporation, Burbank, Calif., a corporation of California
Filed Apr. 24, 1961, Ser. No. 105,085
4 Claims. (Cl. 102—98)

The present invention relates to solid propellants for rocket motors, and its primary object is to provide a new and unique solid propellant system capable of delivering a specific impulse value more than 20% higher than the specific impulse values obtainable with present solid propellant systems.

Another object of the invention is to provide a solid propellant system utilizing high-energy ingredients that have heretofore been considered impractical because of chemical and physical incompatibilities. For example, some of the ingredients contemplated by the present invention react on contact with the usual solid propellant materials, and some of the ingredients are gaseous at normal temperatures and pressures.

A further object of the invention is to provide a solid propellant system having very high combustion efficiency, and one which is capable of a wide range of burning rates. A related object is to provide a solid propellant system which gives a predictable and reproducible thrust program.

These objects are achieved in the present invention by utilizing high-energy, pressurized gaseous oxidizers encapsulated within thinwalled metal containers of chemically active metal, which are bonded together by solid propellant or other matrix material to form a coherent mass. The encapsulated gas is compressed to a density such that the weight of the gas and the weight of the metal capsules are exactly proportioned to ensure stoichiometric combustion. Means is provided for generating heat at an exposed surface of the coherent mass of capsules to raise the temperature of the exposed capsules to the reaction temperature, at which point the capsules react exothermically with the compressed gas to generate sufficient heat to sustain the reaction and to produce high temperature combustion products which are exhausted through the usual nozzle.

The foregoing and other objects and advantages of the present invention will become apparent to those skilled in the art upon consideration of the following detailed description of the preferred embodiment thereof, reference being had to the accompanying drawings, wherein:

FIGURE 1 is a sectional view, taken along the longitudinal axis, of a typical rocket motor loaded with solid propellant embodying a plurality of long tubular capsules containing pressurized gas;

FIGURE 2 is a transverse sectional view of the same, taken at 2—2 in FIGURE 1;

FIGURE 3 is an enlarged fragmentary sectional view of a small portion of solid propellant, taken perpendicular to the longitudinal axes of the tubular capsules;

FIGURE 4 is a view similar to FIGURE 3, of another form of the invention, in which tubular capsules of two different diameters are used;

FIGURE 5 is a partially cut-away side elevational view of a single tubular capsule; and FIGURE 6 is a sectional view through another form of capsule contemplated by the present invention, in which the capsule is generally spherical in shape.

In general, the present invention is based upon the fact that some of the materials that are known to react with the ultimate in high energy output, are combinations of certain chemically active metals, such as aluminum, beryllium, titanium, and alloys thereof, with certain highly energetic gases, such as nitrogen trifluoride ($NF_3$), hydrazine fluoride ($N_2F_4$), nitrogen tetroxide ($N_2O_4$), fluorine, oxygen, ozone, and mixtures thereof. For stoichiometric combustion of the metal capsule, it is necessary that the weight of the encapsulated gas correspond to the weight of the capsule as defined by the combustion equation:

$$\frac{W_g}{W_c} = \frac{m \cdot M_g}{n \cdot M_c} \quad (1)$$

where $W_g$ and $W_c$ represent the weights of the gas and capsule, respectively, $m$ and $n$ equal the number of moles of gas and capsule, respectively, and $M_g$ and $M_c$ represent the molecular weights of the gas and capsule, respectively.

In the case of long, tubular capsules, such as I have shown in FIGURES 1–5, inclusive, the weight of the capsule is shown by the equation:

$$W_c = 2\pi l \cdot r^2 \frac{\rho_c}{F_{ty}} \cdot p \quad (2)$$

where $r$ is the radius of the capsule, $l$ is its length, $p$ is the pressure of the gas, $\rho_c$ is the density of the capsule material, and $F_{ty}$ is the tensile strength of the capsule material.

Further, assuming that the tubular capsule is thinwall, the gas weight is derived as follows:

$$W_g = \pi \cdot l \cdot r^2 \cdot \frac{p}{ZR'T} \quad (3)$$

where $Z$ is the compressibility of the gas, taking into account the deviations from the perfect gas law, $R'$ is the gas constant for the particular gas, and $T$ is the temperature of the gas.

Substituting Equations 2 and 3 in Equation 1, and taking into account the fact that:

$$R' = \frac{R}{M_g}$$

where $R$ is the universal gas constant, we obtain the equation:

$$F_{ty} = 2\frac{\rho_c}{M_c} \cdot ZRT \cdot \frac{m}{n} \quad (4)$$

From this, it is seen that the condition for stoichiometric combustion may be fulfilled: (a) independent of capsule diameter, (b) independent of pressure, since $r$, $l$, and $p$ appear to similar powers and have cancelled out, and (c) independent of the molecular weight of the gas. Thus, no matter what diameter or basic shape the capsule has, and at what pressure the gas is stored, the gas will be capable, stoichiometrically, of consuming the capsule.

Referring now to FIGURES 1–3 of the drawings, I show a typical rocket motor 10, consisting of an elongated tubular case 11, having a rounded closure 12 at the front end thereof. Attached to the rear end of the case 11 by a threaded connection 13 is an aft closure 14 having an integral nozzle 15.

Loaded in the case 11 and bonded to the inner surface thereof is a body 20 of propellant, having a central combustion port 21 extending along the longitudinal axis of the case. An igniter 22 is disposed centrally within the port 21 at the front end thereof, and is secured to the case by means of a base plate 23, which is bonded or otherwise secured to the front closure 12.

The body 20 of propellant consists of a large number of long, slender, cylindrical tubes, or capsules 24, which are disposed parallel to the longitudinal axis of the combustion port 21. As best shown in FIGURE 1, the capsules 24 are arranged in layers lengthwise of the case 11. In the illustrated example, there are three layers, 25, 26 and 27, of capsules, each layer consisting of a plurality of capsules packed closely together, parallel to one another, with their ends lying within two parallel planes that are perpendicular to the longitudinal axis of the case 11. The capsules 24 are embedded within a matrix 30, preferably of standard solid propellant, which is of a rubbery or plastic nature, that bonds to the capsules and to the inner surface of the cage 11. The capsules 24 and matrix 30 thus form a rigid, coherent body capable of withstanding the stresses to which it is exposed during the burning period.

Each of the capsules 24 is made of chemically active metal selected from the group consisting of aluminum, beryllium, titanium, and alloys thereof. In the preferred embodiment of FIGURES 1–3, the capsules are long, slender, cylindrical tubes which are pinched together at their ends, as shown at 31 in FIGURE 5, and these pinched-together ends are pressure welded to form a pressure-sealed closure.

The walls of the tubes 24 are relatively thin, being of the order of $\frac{1}{30}$ to $\frac{1}{15}$ of the diameter of the tube, depending upon the tensile strength of the metal and the pressure of the gas. The wall thickness of the tube is determined by the equation:

$$t = \frac{rp}{F_{ty}}$$

and the ratio of the tube thickness to diameter is shown as:

$$\frac{t}{d} = \frac{p}{2F_{ty}}$$

For example, with aluminum alloys having tensile strength $F_{ty} = 50,000$ p.s.i., and a gas pressure of 4,000 p.s.i.a.

$$\frac{d}{t} = 0.04$$

which means that the wall thickness is $\frac{1}{25}$ the diameter of the tube. Thus, with a tube having a wall thickness of 0.005 inch and allowing a safety factor of 2, the diameter of the tube would be $\frac{1}{8}$ inch.

Each of the tubes 24 contains a gas or mixture of gases, under relatively high pressure, which is energetically reactive with the metal of the capsule at elevated temperatures to produce an exothermic reaction generating a great deal of heat. The gases that have been found to be most effective for the purpose are hydrazine fluoride ($N_2F_4$), nitrogen tetroxide ($N_2O_4$), nitrogen trifluoride ($NF_3$), fluorine, oxygen, ozone, and mixtures thereof. While cryogenic systems using fluorine, oxygen, ozone, or mixtures thereof are entirely feasible, considerably more latitude in capsule material and design is gained by using the compounds $N_2F_4$, $N_2O_4$, and $NF_3$, or mixtures thereof, owing to the lower gas pressures which are involved.

An approximation of the tensile strength required for a metal capsule of aluminum, for example, containing $N_2F_4$ can be obtained by setting the compressibility factor $Z$ equal to unity (the gas conditions are close to critical conditions) and setting the $m/n$ ratio equal to 0.75 (combustion between $N_2F_4$ and aluminum). At room temperature, the required tensile strength is 57,000 p.s.i., which is easily obtainable.

Experimental investigation has shown that solid propellant of the present invention, in which 15% of the total weight of the propellant is standard rubber base propellant matrix, 15% by weight is aluminum tubing, 45% by weight is $N_2F_4$, and 25% by weight is $N_2O_4$, yields a theoretical specific impulse of 308 seconds. Higher impulse is obtainable with beryllium capsules containing oxygen or fluorine.

Maximum energy is obtained from the propellant when the overall density of the capsules is high. This condition is obtained with high gas pressures and high molecular weight of the gas. The total energy output of the propellant is also affected by the relative proportions of capsules to the matrix 30, the maximum energy being obtained when the proportion of matrix is minimum.

FIGURE 4 shows a slightly modified form of the invention, in which tubular capsules 24' and 24" of two different diameters are packed together with minimum interstices between them. These interstices are likewise filled with propellant matrix 30', but because the smaller diameter tubes 24" tend to fill in the spaces between the larger diameter tubes 24', the total proportion by weight of matrix to capsules is less in this form than in the earlier embodiment. The wall thickness of the smaller diameter tubes 24" are also of the order of $\frac{1}{30}$ to $\frac{1}{15}$ of the diameter, and the pressure of the encapsulated gas is the same as in the larger diameter tubes 24 and 24'.

FIGURE 6 shows still another form of capsule, designated by the reference numeral 34, that may be used in the present invention. The capsule 34 consists of a thin walled sphere 35 of one of the metals mentioned earlier. A loading tip 36 projects radially from one side of the sphere 35, and when the sphere has been filled with gas to the desired pressure, the tip 36 is pinched closed, as shown in the drawing, and is pressure-welded to make it absolutely gas tight. The wall thickness of the spherical capsule 34 is of the order of $\frac{1}{30}$ to $\frac{1}{15}$ of its diameter, as in the earlier embodiments, and the capsules are likewise embedded in a matrix of solid propellant.

In loading the rocket case 11 with the propellant of the present invention, the aft head closure and nozzle 14, 15 is removed, and the case is preferably secured in an upright position, with the end closure 12 at the bottom. The usual mandrel (not shown) which forms the combustion port 21 is then positioned within the case, and the space between the mandrel and the case is then filled with the first layer 25 of long tubular capsule 24 or 24' and 24", until the capsules are tightly packed in place. Propellant matrix 30 is poured into the case to fill the interstices between the capsule up to the top ends of the capsules. The second layer 26 of capsules is then packed into the space between the mandrel and the case, and additional propellant matrix 30 is poured in to bring the level up to the top ends of the second layer of capsules; after which the third layer 27 of capsules and matrix is loaded into the case. The loaded case is then cured in the usual manner to polymerize the rubber base propellant. The mandrel is then removed, the igniter 22, 23 is secured in place, and the aft head closure 14, 15 is screwed onto the case. In the case of the spherical capsules 34 of FIGURE 6, the capsules may be mixed with propellant before loading into the case, or the capsules may be mixed with propellant before loading them into the case, or the capsules may be poured in first and the propellant poured in afterward. In either case, care must be taken, of course, to ensure that there are no voids in the propellant matrix.

The exposed surface of the combustion port 21 is primarily propellant matrix 30, and upon initiation of the igniter 22, this exposed surface of propellant is ignited and burns at an extremely high temperature. As the innermost capsules 24 are exposed to combustion, the walls of the exposed capsules are ruptured by gas pressure, and at the high temperatures that are obtained, the gas reacts energetically with the metal of the capsule in an exothermic reaction that produces a great deal of heat. The propellant system of the present invention is capable of delivering a specific impulse of over 300 seconds of standard conditions, which is considerably higher than that obtainable with conventional solid propellants. The orientation of the long, tubular capsules parallel to the longitudinal axis of the cylindrical combustion port 21 assures that the burning surface will remain parallel to the capsule axes and will give a predictable and reproducible thrust program.

One important advantage of the invention is that a wide range of burning rates is obtainable by varying matrix composition, or the capsule dimensions, configurations and compositions. A further advantage is that the ratio of the weight of the capsule case to its contained oxidizer may be caried to some extent, since the oxidizer-fuel balance and other ballistic properties of the propellant matrix can be sensitively adjusted.

While I have shown and described in considerable detail what I believe to be the preferred form of my invention, it will be apparent to those skilled in the art that many changes may be made in the shape and arrangement of the several parts without departing from the broad scope of the invention, as defined in the following claims.

I claim:

1. A solid propellant for rocket motors, comprising a plurality of capsules embedded in a polymeric rubber base propellant to form a coherent mass, each of said capsules being formed of a chemically active metal selected from the group consisting of aluminum, beryllium, titanium and alloys thereof, and each of said capsules containing a gas selected from the group consisting of nitrogen trifluoride, hydrazine fluoride, nitrogen tetroxide, fluorine, oxygen, ozone and mixtures thereof, said gas being compressed to a density such that its weight and the weight of said capsule correspond to those defined by the equation for stoichiometric combustion, said gas combining with said metal at an elevated temperature to produce an exothermic reaction, whereby upon exposure of said capsules to a reaction temperature said capsules react exothermically with said gas to generate sufficient heat to sustain the reaction and to produce high temperature combustion products useful for rocket propulsion.

2. A solid propellant for rocket motors as defined in claim 1, wherein the wall thickness of said capsules is of the order of 1/30 to 1/15 of the diameter thereof, and the gas contained within the capsule is compressed to the density satisfying the equation:

$$\frac{W_g}{W_c} = \frac{m \cdot M_g}{n \cdot M_c}$$

wherein $W_g$ is the weight of the gas, $W_c$ is the weight of the capsule, $m$ equals the number of moles of gas, $n$ equals the number of moles of capsule, $M_g$ is the molecular weight of the gas and $M_c$ is the molecular weight of the capsule.

3. A solid propellant for rocket motors as defined in claim 1, wherein said capsules are in the form of elongated cylindrical tubes, said tubes being oriented parallel to one another with their longitudinal axes parallel to said exposed surface, whereby combustion proceeds normal to the longitudinal axes of said cylindrical tubes.

4. A solid propellant for rocket motors as defined in claim 1, wherein said capsules are generally spherical in configuration, and are dispersed in a rubbery matrix of fuel/oxidizer propellant.

References Cited by the Examiner

UNITED STATES PATENTS

| | | | |
|---|---|---|---|
| 2,072,671 | 3/37 | Foulke | 102—40 |
| 2,802,332 | 8/57 | Orosino | 60—35.6 |
| 2,942,961 | 6/60 | Eiszner et al. | |
| 2,942,962 | 6/60 | Morello et al. | |
| 2,960,935 | 11/60 | Colpitts | 102—70 |
| 2,970,898 | 2/61 | Fox. | |

CARL D. QUARFORTH, *Primary Examiner.*

LEON D. ROSDOL, *Examiner.*